April 7, 1970 W. DILLENBURGER ETAL 3,505,473

CIRCUIT ARRANGEMENT FOR COMPENSATING FOR SYNCH SIGNAL ERROR IN A TELEVISION SIGNAL

Filed Sept. 14, 1966 3 Sheets-Sheet 1

Inventors:
Wolfgang Dillenburger
Gerhard Krause

Inventors:
Wolfgang Dillenburger
Gerhard Krause

Inventors:
Wolfgang Dillenburger
Gerhard Krause

United States Patent Office 3,505,473

Patented Apr. 7, 1970

3,505,473

CIRCUIT ARRANGEMENT FOR COMPENSATING FOR SYNCH SIGNAL ERROR IN A TELEVISION SIGNAL

Wolfgang Dillenburger, Nieder Ramstadt, near Darmstadt, and Gerhard Krause, Darmstadt, Germany, assignors to Fernseh G.m.b.H., Darmstadt, Germany Filed Sept. 14, 1966, Ser. No. 580,150
Claims priority, application Germany, Sept. 16, 1965, F 47,200
Int. Cl. H04n 7/00
U.S. Cl. 178—69.5 9 Claims

ABSTRACT OF THE DISCLOSURE

A circuit in which the synch signal error in a television signal is compensated. The television signal is applied to a tapped delay line, and each tap emits the television signal delayed by a different time interval. In passing through the delay line, the applied television signal experiences an incrementally increasing time delay. Connected to each tap is a control arrangement in which the signal from the tap is combined, in opposite phase, with a reference synch signal. The control circuit arrangements are interconnected for identifying which one of the taps differs by a minimum amount, in time relationship, from the applied reference synch signal. The tap providing a signal with such minimum difference then solely connected to an output circuit.

The present invention relates to an error compensating circuit arrangement. More particularly, the invention relates to a circuit arrangement for compensating for a synch signal error in a television signal.

Phase or time relation errors occur in the television synch signals included in a television signal, especially when the television signal is read out from a magnetic storage. To compensate for such errors, the television signal may be incrementally increasingly delayed in time in a plurality of series-connected time delay stages. The television synch signal at each time delay stage may then be compared in phase or time relation with a reference synch signal and the television signal of that time delay stage at which the television synch signal and the reference synch signal coincide is transferred to an output. The television synch signals comprise either the line synch pulses or oscillations occurring during the blanking intervals. The television signal may be supplied to the input of a multiple-tapped delay line which terminates in a resistance equal to the characteristic impedance of the delay line. A phase comparator is connected to each tap point of the delay line for comparing the television synch signal at the corresponding tap point with the reference synch signal. The television signal is transferred to the output from the tap point the corresponding comparator of which indicates a minimum phase or time difference between the corresponding television synch signal and the reference synch signal.

The television signal may be transferred from that time delay stage at which the phase difference is less than a determined magnitude. The oscillations functioning as synch signals are additively superimposed in each delay stage, so that if there is no error in time relation or phase, said oscillations are in phase. The resultant signal may then be limited in a limiter circuit and the output signal provided by the limiter circuit may be utilized to actuate a switch to transfer the television signal from the delay line only when the mean value of the resultant signal is less than a determined threshold level. This arrangement operates satisfactorily only if the amplitudes of the television synch signal and the reference synch signal are equal, because only then is the resultant signal of rectified synch signals zero when the synch signals are in phase and thus in such case is less than said determined threshold level.

If the amplitudes of the television synch signals and the reference synch signals are not equal, the resultant signal may be greater than the threshold level of the limited even when the cynch signals are in phase, so that the television signal is not transferred from the delay line to the output when it should be. To insure satisfactory operation of the arrangement independently of the amplitudes of the television synch signals and the reference synch signals, the television synch signals may be maintained at equal amplitudes by an amplitude limiter. The amplitude limiter may be made operative only during the occurrence of the television synch signals. If the synch signal occurs in the post-synchronizing blanking interval or back porch of the television signal, the amplitude limiter would be operative for only a brief, exactly determined, time period. This creates difficult problems in the design of a suitable amplitude limiter.

The principal object of the present invention is to provide a new and improved circuit arrangement for compensating for synch signal error in a television signal. The circuit arrangement of the present invention compensates for synch signal errors in a television system with efficiency, effectiveness and reliability.

In accordance with the present invention, the synch signal error compensating circuit arrangement comprises a delay line comprising a plurality of time delay stages connected in series and a tap connected to each time delay stage. A television signal including television synch signals is supplied to the delay line for incrementally increasing the time delay of the television signal in each time delay stage of the delay line. A control circuit is connected between each of the taps of the time delay stages and an output. Each control circuit includes an adder for combining the television synch signal at the corresponding time delay stage in opposite phase with a reference synch signal to provide a resultant signal. The resultant signal is rectified by a rectifier connected to the adder and the control circuit utilizes the resultant signal to determine which television synch signal differs from the reference synch signal a minimum amount in time relation. The determined television signal is transferred from the corresponding time delay stage to the output.

In order that the present invention may be readily carried into effect, it will now be described with reference to the accompanying drawings, wherein:

FIG. 1 is a block diagram of an embodiment of the circuit arrangement of the present invention for compensating for synch signal errors in a television circuit;

FIGS. 2*a* and 2*b* are graphical illustrations of the error volage for equal and unequal amplitudes of synch voltages;

Figure 1:
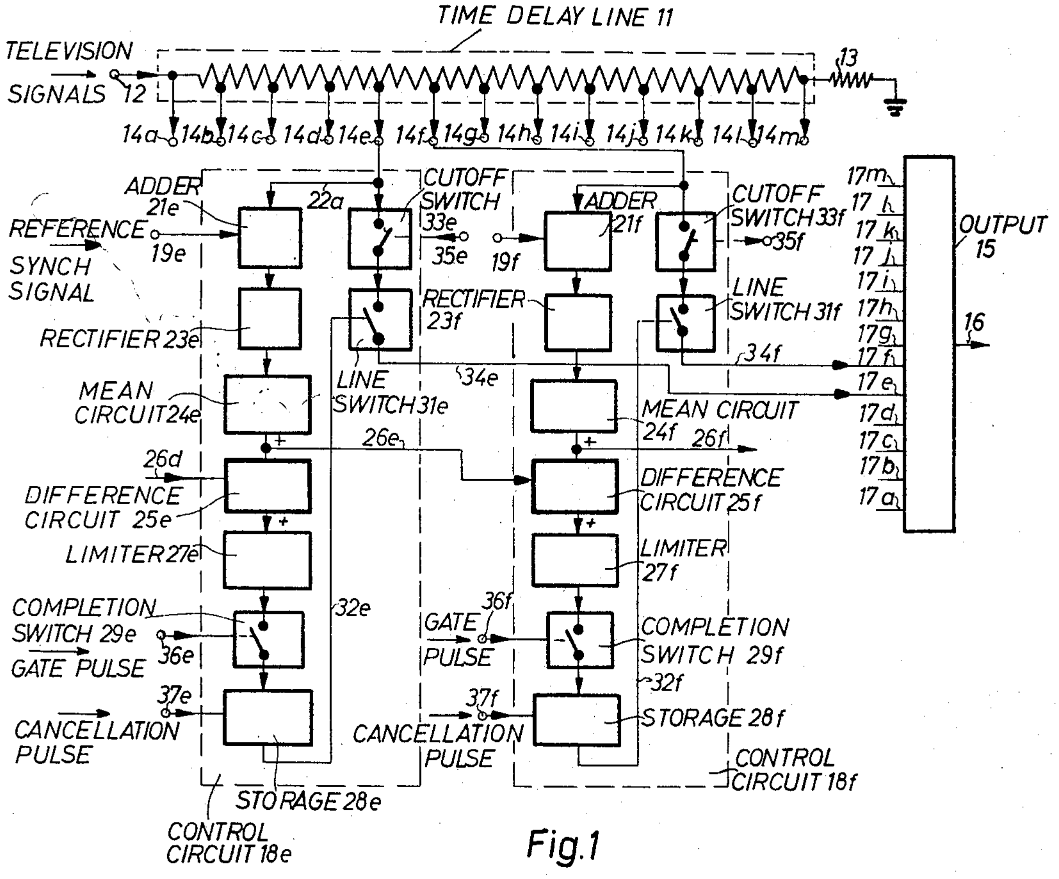

In FIG. 1, television signals including television synch signals are supplied to the input of a delay line 11 via an input terminal 12. The delay line 11 comprises a plurality of time delay stages and a tap connected to each time delay stage and terminates in a resistance 13 equal to the characteristic impedance of said delay line, which resistance is connected to ground. A tap 14*a* is connected to the first time delay stage, a tap 14*b* is connected to the second time delay stage, a tap 14*c* is connected to the third time delay stage, a tap 14*d* is connected to the fourth time delay stage, a tap 14*e* is connected to the fifth time delay stage, a tap 14*f* is connected to the sixth time delay stage, a tap 14*g* is connected to the seventh time delay stage, and so on. The time delay of the television signal is incrementally increased in each time delay stage of the delay line 11.

An output 15 comprises an output line 16 and a plurality of input lines 17*a* to 17*m*. A control circuit 18*a* is connected between the tap 14*a* and the input line 17*a* of the output 15, a control circuit 18*b* is connected between the tap 14*b* and the input line 17*b* of the output 15, a control circuit 18*c* is connected between the tap 14*c* and the input line 17*c* of the output 15, a control circuit 18*d* is connected between the tap 14*d* and the input line 17*d* of the output 15, a control circuit 18*e* is connected between the tap 14*e* and the input line 17*e* of the output 15, a control circuit 18*f* is connected between the tap 14*f* and the input line 17*f* of the output 15, a control circuit 18*g* is connected between the tap 14*g* and the input line 17*g* of the output 15, and so on. The control circuits 18*a* to 18*m* are identical. Only the control circuits 18*e* and 18*f* are shown in FIG. 1.

Each of the control circuits 18*a* to 18*m* combines the television synch signal at the corresponding time delay stage in opposite phase with a reference synch signal supplied to said control circuits via input terminals 19*a* to 19*m*, respectively, determines which television synch signal differs from the reference synch signal a minimum amount in time relation, and transfers the determined television synch signal from the corresponding time delay stage to the output 15.

Since the control circuits 18*a* to 18*m* are identical, the components of only two of said control circuits are shown in FIG. 1 and the components of only the control circuit 18*e* are described. The television signal from the tap 14*e* is supplied to one input of an adder 21*e* via a line 22*e*. The reference signal supplied to the input terminal 19*e* is supplied to the other input of the adder 21*e*.

The television synch signal is assumed to be an oscillating signal and the reference synch signal is an oscillating signal of the same frequency as the oscillating television synch signal. The reference synch signal is supplied to the adder 21*e* via the input terminal 19*e* with a phase such that when the synch signal or time error of the television is zero, said reference synch signal is in opposite phase with, or 180° displaced from, the television synch signal.

When the television synch signal appears in the television signal, it is added to the reference synch signal in phase opposition in the adder 21*e*. The combination, sum or resultant signal is supplied to a rectifier 23*e* which rectifies it. The rectified resultant signal is supplied to a mean circuit 24*e* which provides the mean value of said rectified resultant signal.

The mean rectified resultant signal is supplied to a difference circuit 25*e* and to the difference circuit 25*f* of the next-succeeding control circuit 18*f* via a line 26*e*. The mean rectified resultant signal is supplied to a limiter 27*e*, which produces an output signal only when the value of the mean rectified resultant signal is less than a determined amount or threshold level. The output signal of the limiter 27*e* is a DC voltage and is supplied to a storage 28*e* via a completion switch 29*e*. The storage 28*e* stores the output signal of the limiter 27*e* for one line period until the next reference synch signal is supplied. The completion switch 29*e* may be connected between the difference circuit 25*e* and the limiter 27*e*.

A signal is thus stored in the storage 28*e* only when the mean rectified resultant signal from the mean circuit 24*e* is less than said determined amount. Upon the termination of a line period after the signal is stored in the storage 28*e*, said signal is supplied to a line switch 31*e* via a line 32*e* and closes said line switch. When the line switch 31*e* is closed it closes a circuit from the tap 14*e* to the input line 17*e* of the output 15 via a cutoff switch 33*e* and a line 34*e*.

When the phase or time difference between the television synch signal and the reference synch signal is between zero and the determined amount, but is not zero, two adjacent control circuits 18*a* to 18*m* may transfer the television signal from the corresponding taps to the output 15. The cutoff switch 33*e* is provided between the tap 14*e* and the line switch 31*e* to prevent this. The cutoff switch 33*e* is opened via a signal supplied to an input terminal 35*e* by the next-succeeding control circuit 18*f* when the control circuit 18*f* transfers the television signal from the tap 14*f* to the input line 17*f* of the output 15.

The completion switch 29*e* is closed by a gate pulse or signal which is supplied to said completion switch via an input terminal 36*e* when the phase comparing operation is completed. Just prior to the application of the gate pulse, the storage of each of the control circuits is prevented from closing the corresponding line switch by a cancellation pulse or signal supplied to said storage. The cancellation pulse is supplied to the storage 28*e* via an input terminal 37*e*. The gate pulses and cancellation pulses are provided by any suitable sources thereof.

Figures 2A, 2B:
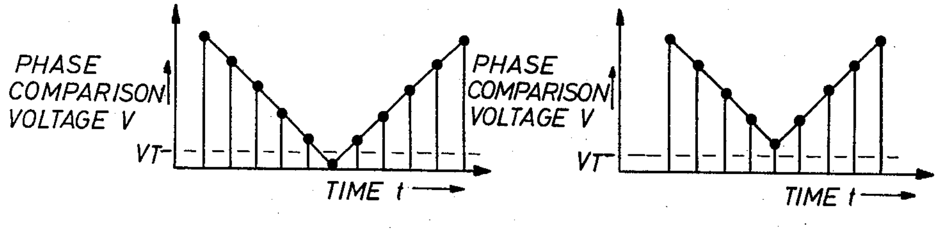

FIGS. 2*a* and 2*b* illustrate the variation of the phase comparison voltages of adjacent control circuits 18*a* to 18*m*. The abscissa of each of FIGS. 2*a* and 2*b* represents the time *t* and the ordinate of each of FIGS. 2*a* and 2*b* represents the phase comparison voltage V. In FIG. 2*a*, the television synch signal and the reference synch signal have the same amplitude. The phase comparison voltage V is less than the threshold level or determined amount VT in at least one of the control circuits 18*a* to 18*m* and the television signal is transferred by said one of said control circuits from the delay line 11 to the output 15.

In FIG. 2*b*, the television synch signal and the reference synch signal have different amplitudes. The phase comparison voltage V may not be less than the threshold level VT in any of the control circuits, even when the television synch signal and the reference synch signal are in phase opposition. In this case, none of the control circuits 18*a* to 18*m* transfers the television signal from the delay line 11 to the output 15. The control circuit in which the time or phase difference between the television synch signal and the reference phase signal is a minimum may be made to transfer the television signal from the delay line 11 to the output 15, in the aforedescribed case, by determining the difference between the mean rectified resultant signals of two adjacent control circuits.

The difference between the mean rectified resultant signals of the control circuits 18*e* and 18*f* is determined by the difference circuit 25*f* of the control circuit 18*f*. The difference circuit 18*f* has two inputs and an output. The mean rectified resultant signal of the mean circuit 24*f* is supplied to one input of the difference circuit 18*f* and the mean rectified resultant signal the means circuit 24*e* of the next-preceding control circuit 18*e* is supplied to the other input of said difference circuit via the line 26*e*.

The minimum phase or time difference between the television synch signal and the reference synch signal is indicated by a change of polarity of such difference. The difference circuits 25*a* to 25*m* operate to close the circuit between the corresponding mean circuit 24*a* to 24*m* and the corresponding limiter 27*a* to 27*m*, when the phase or time difference between the television and reference synch signals is positive. However, the control circuits preceding the control circuit which indicates a change of polarity of the phase or time difference between the television synch signal and the reference synch signal are prevented from transferring the television signal from the delay line 11 to the output 15 because of the opening of the cutoff switches of such preceding control circuits in the aforedescribed manner. Thus, the television signal is transferred from the delay line 11 to the output 15 by only one of the control circuits.

The phase or time difference between the television and reference synch signals is positive in adjacent control circuits even above the threshold level. The corresponding control circuits are thus prevented from transferring the television signal by the next-succeeding control circuit, including the control circuit 18_m_ connected to the tap 14_m_ at the end of the delay line 11. The control circuit 18_m_ does not transfer the television signal from the delay line 11 to the output 15, but operates in the same manner as the control circuits 18_a_ to 18_n_ to provide a cutoff signal for opening the cutoff switch 33_n_ of the control circuit 18_n_.

The difference signal may be provided by a difference circuit 25_a_ to 25_m_ which comprises an adder and a second rectifier utilizing a diode connected with reverse polarity for supplying a negative voltage.

Figure 3:
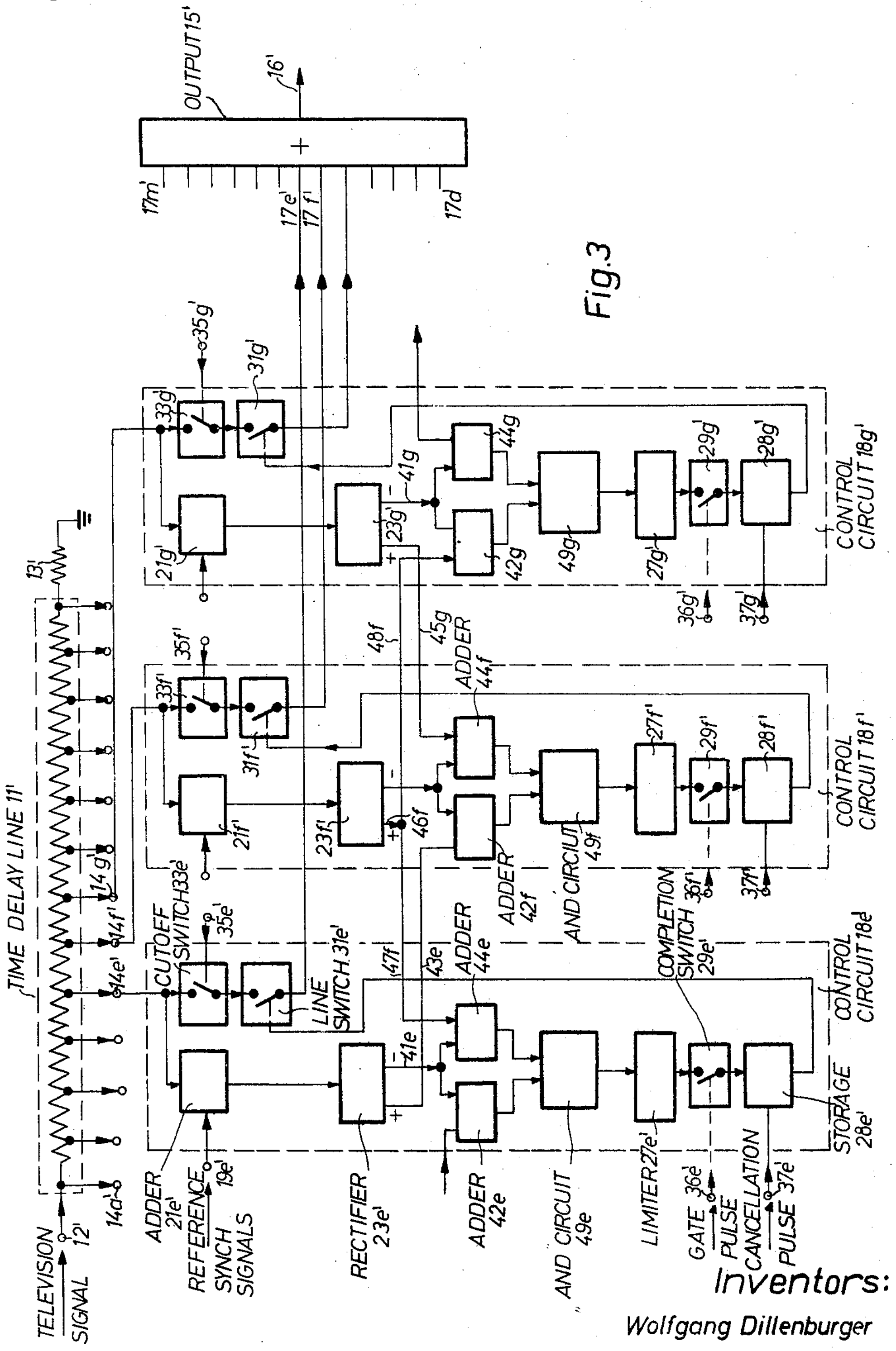
FIG. 3 is a modification of the circuit arrangement of FIG. 1.

In the modification of FIG. 3, each of the similarly identified components is similar to the corresponding component of the embodiment of FIG. 1. In FIG. 3, each of the control circuits 18_a'_ to 18_m'_ functions to determine whether or not the following condition is satisified.

(1) $(V_x - V_{x+1})$ AND $(V_{x+2} - V_{x+1}) \geqq 0$ wherein $V_x$ is the rectified positive polarity voltage at the $X^{th}$ tap of the delay line 11', $V_{x+1}$ is the rectified positive polarity voltage of the $(X+1)^{th}$ time delay stage, $V_{x+2}$ is the rectified positive polarity voltage of the $(X+2)^{th}$ time delay stage and "AND" indicates a logical AND operation. Only the tap at which the condition of Equation 1 is satisified is connected to the output 15' by the corresponding one of the control circuits 18_a'_ to 18_m'_. A maximum rectified voltage does not satisfy the condition of Equation 1 since it is of opposite polarity.

The modification of FIG. 3 is essentially similar to the embodiment of FIG. 1, except that in FIG. 3 the rectifiers 23_a'_ to 23_m'_ provide equal output voltage of opposite polarity. This may be achieved by a pair of rectifier components connected with opposite polarity. The negative voltage output of the rectifier 23_f'_ is provided in a line 41_f_ and is combined in an adder 42_f_ with the positive voltage output from the rectifier 23_e'_ of the next-preceding control circuit 18_e'_ via a line 43_e_ and is combined in an adder 44_f_ with the positive voltage output from the rectifier 23_g'_ of the next-succeeding control circuit 18_g'_ via a line 45_g_.

The positive voltage output of the rectifier 23_f'_ is provided in the line 46_f_ and is combined in the adder 44_e_ of the next-preceding control circuit 18_e'_ via a line 47_f_ with the negative voltage output of the rectifier 23_e'_ of said control circuit 18_e'_. The positive voltage output of the rectifier 23_f'_ is also combined in the adder 42_g_ of the next-succeeding control circuit 18_g'_ via a line 48_f_ with the negative voltage output of the rectifier 23_g'_ of said control circuit 18_g'_. The outputs of the adders 42_f_ and 44_f_ are supplied to the two inputs of an AND circuit or gate 49_f_. The output of the AND circuit 49_f_ is supplied to the limiter 27_f'_, then to the completion switch 29_f'_ and then to the storage 28_f'_ and provides a control voltage for closing the line switch 31_f'_ via the line 32_f'_ in the aforedescribed manner to satisfy Equation 1.

In a manner analogous to the aforedescribed manner, the circuit arrangement of FIG. 3 may be modified so that each of the control circuits 18_a'_ to 18_m'_ functions to determine whether or not the condition (2) $(V_{x+1} - V_x)$ AND $(V_{x+1} - V_{x+2}) \leqq 0$ is satisfied, wherein $V_x$ is the rectified positive polarity voltage at the $X^{th}$ tap of the delay line 11', $V_{x+1}$ is the rectified positive polarity voltage of the $(X_{x+1})^{th}$ time delay stage, $V_{x+2}$ is the rectified positive polarity voltage of the $(X+2)^{th}$ time delay stage and "AND" indicates a logical AND operation; or functions to determine whether or not the condition (3) $(V_x - V_{x+1})$ AND $(V_{x+2} - V_{x+1}) \leqq 0$ is satisfied, wherein $V_x$ is the rectified negative polarity voltage at the $X^{th}$ tap of the delay line 11', $V_{x+1}$ is the rectified negative polarity voltage of the $(X+1)^{th}$ time delay stage, $V_{x+2}$ is the rectified negative polarity voltage of the $(X+2)^{th}$ time delay stage and "AND" indicates a logical AND operation; or functions to determne whether or not the condition (4) $(V_{x+1} - V_x)$ AND $(V_{x+1} - V_{x+2}) \geqq 0$ is satisfied, wherein $V_x$ is the rectified negative polarity voltage at the $X^{th}$ tap of the delay line 11', $V_{x+1}$ is the rectified negative polarity voltage of the $(X+1)^{th}$ time delay stage, $V_{x+2}$ is the rectified negative polarity voltage of the $(X+2)^{th}$ time delay stage and "AND" indicates a logical AND operation. In each of the foregoing cases, only the tap at which the condition of Equation 2, 3 or 4 is satisfied is connected to the output 15' by the corresponding one of the control circuits.

Figure 4:
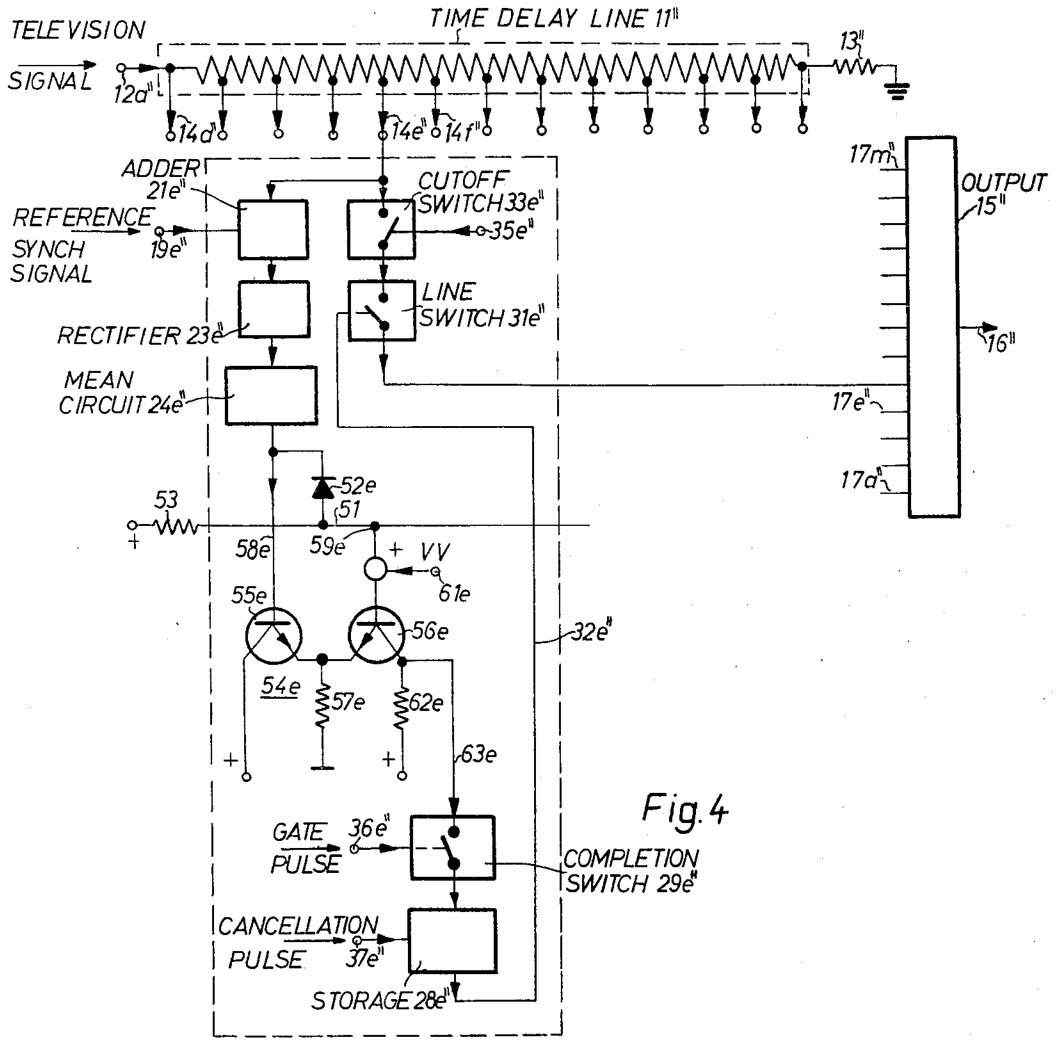
FIG. 4 is another modification of the circuit arrangement of FIG. 1.

In the modification of FIG. 4, as in FIG. 3, each of the similarly identified components is similar to the corresponding component of the embodiment of FIG. 1.

The modification of FIG. 4 is essentially similar to the embodiment of FIG. 1, except that in FIG. 4 the mean rectified resultant voltage of positive polarity provided by the mean circuit 24_e''_ is applied to a line 51, common to all the time delay stages, since it is coupled to each of the taps 14_a''_ to 14_m''_ via the components of the corresponding control circuits 18_a''_ to 18_m''_, via a diode 52_e_. The line 51 terminates, via a resistor 53, in a source of positive voltage having a magnitude which is greater than any rectified positive polarity voltage, so that the voltage on said line approximates the lowest voltage delivered by any of the control circuits 18_a''_ to 18_m''_. The voltage on the line 51 is utilized as the reference voltage for a symmetrical limiter 54_e_.

The symmetrical limiter 54_e_ comprises a pair of transistors 55_e_ and 56_e_. The emitter electrodes of the transistors 55_e_ and 56_e_ are connected to each other and to ground via a common resistor 57_e_. The mean rectified resultant voltage or signal from the mean circuit 24_e''_ is applied to the base electrode of the transistor 55_e_ via a line 58_e_. The potential on the common line 51 is applied to the base electrode of the transistor 56_e_ via a line 59_e_ and is the reference potential for the symmetrical limiter 54_e_.

In order to insure that the television signal transferred from the delay line 11'' to the output 15'' is from the time delay stage of said delay line of which the mean rectified resultant voltage applied to the transistor 55_e_ via the line 58_e_ is a minimum, a constant positive potential VV is applied to the line 59_e_ via an input terminal 61_e_. The transistor 56_e_ is thus switched to its conductive condition, since it is an NPN type transistor, and conducts current and produces across its collector load resistor 62_e_ a voltage which is supplied to the completion switch 29_e''_ via a line 63_e_ and then to the storage 28_e''_ and provides a control voltage for closing the line switch 31_e''_ in the aforedescribed manner.

In the modification of FIG. 4, the adjacent control circuit must be maintained in open circuit condition by the completion switch 29_a''_ to 29_m''_, since the minimum rectified voltage may decrease by a variation which occurs exactly half-way between adjacent taps 14_a''_ to 14_m''_ of the delay line 11''.

The voltage on the common line 51 may be subtracted from the rectified voltages $V_{x-1}$, $V_x$, $V_{x+1}$ instead of being utilized as the reference potential for the symmetrical limiter 54$a$ to 54$m$. Furthermore, instead of being subtracted from the rectified voltages, the voltage on the common line 51 may be varied to a determined potential such as, for example, a reference potential of zero volts, by suitable means.

The polarities and directions of the various voltages described are not rigid and may be varied within the scope of the invention. Amplifiers are utilized where necessary, in the circuit arrangement of the present invention, to provide suitable signal amplitudes.

While the invention has been described by means of specific examples and in specific embodiments, we do not wish to be limited thereto, for obvious modifications will occur to those skilled in the art without departing from the spirit and scope of the invention.

What we claim is:

1. A circuit arrangement for compensating for synch signal errors in a television signal comprising, in combination, a delay line with a plurality of time delay stages connected in series and a tap connected to each time delay stage; means for supplying a television signal including television synch signals to said delay line for incrementally increasing the time delay of said television signal through each time delay stage of said delay line; output means; control means connected between each of the taps of said time delay stages and said output means, said control means comprising: means for combining the television synch signal at each of said time delay stages in opposite phase with a reference synch signal; means for identifying the preferred tap from which the television synch signal differs from said reference synch signal by a minimum amount in time relationship; means for transferring the television signal from said preferred tap to said output means; means for inhibiting the transfer of said television synch signal to said output means from the remaining taps of said delay line whereby only the television synch signal from said preferred tap is transferred to said output means; and means for applying reference synch signals to each of said control means, so that said output means transmits a signal differing from said reference synch signal by a minimum amount in time relationship.

2. A circuit arrangement as claimed in claim 1 wherein one of said control means is connected to one corresponding tap of said delay line, each of said control means including adder means for combining the television synch signal from the tap at the corresponding time delay stage in opposite phase with said reference synch signal to provide a resultant signal; and rectifying means having an output and an input connected to said adder means for rectifying said resultant signal, the rectified resultant signal being utilized to determine which television synch signal differs from said reference synch signal by a minimum amount in time relation.

3. A circuit arrangement as claimed in claim 2, wherein each of said control means further includes a difference circuit having an input connected to the output of the rectifying means of said control means and another input connected to the output of the rectifying means of the next-preceding control means for determining the difference between the rectified resultant signal of said control means and the rectified resultant signal of the next-preceding control means, the difference between said rectified resultant signals being a minimum upon a change in polarity thereof from one of said control means to the next-succeeding control means.

4. A circuit arrangement as claimed in claim 2, wherein each of said control means further includes additional adder means having input means connected to the output of the rectifying means of said control means, input means connected to the output of the rectifying means of the next-preceding control means and input means connected to the output of the rectifying means of the next-succeeding control means and output means, and AND circuit means having inputs connected to the output means of said additional adder means for transferring said television signal from said delay line to said output only when $$(V_x-V_{x+1}) \text{ AND } (V_{x+2}-V_{x+1}) \geqq 0$$

wherein $V_x$ is the rectified positive polarity voltage of the $X^{th}$ time delay stage of said delay line, $V_{x+1}$ is the rectified positive polarity voltage of the $(X+1)^{th}$ time delay stage, $V_{x+2}$ is the rectified positive polarity voltage of the $(X+2)^{th}$ time delay stage and AND indicates a logical AND operation.

5. A circuit arrangement as claimed in claim 2, wherein each of said control means further includes additional adder means having input means connected to the output of the rectifying means of said control means, input means connected to the output of the rectifying means of the next-preceding control means and input means connected to the output of the rectifying means of the next-succeeding control means and output means, and AND circuit means having inputs connected to the output means of said additional adder means for transferring said television signal from sad delay line to said output only when $$(V_{x+1}-V_x) \text{ AND } (V_{x+1}-V_{x+2}) \leqq 0$$

wherein $V_x$ is the rectified positive polarity voltage of the $X^{th}$ time delay stage of said delay line, $V_{x+1}$ is the rectified positive polarity voltage of the $(X+1)^{th}$ time delay stage, $V_{x+2}$ is the rectified positive polarity voltage of the $(X+2)^{th}$ time delay stage and AND indicates a logical AND operation.

6. A circuit arrangement as claimed in claim 2, wherein each of said control means further includes additional adder means having input means connected to the output of the rectifying means of said control means, input means connected to the output of the rectifying means of the next-preceding control means and input means connected to the output of the rectifying means of the next-succeeding control means and output means, and AND circuit means having inputs connected to the output means of said additional adder means for transferring said television signal from said delay line to said output only when $$(V_x-V_{x+1}) \text{ AND } (V_{x+2}-V_{x+2}) \leqq 0$$

wherein $V_x$ is the rectified negative polarity voltage of the $X^{th}$ time delay stage of said delay line, $V_{x+1}$ is the rectified negative polarity voltage of the $(X+1)^{th}$ time delay stage, $V_{x+2}$ is the rectified negative polarity voltage of the $(X+2)^{th}$ time delay stage and AND indicates a logical AND operation.

7. A circuit arrangement as claimed in claim 2, wherein each of said control means further includes additional adder means having input means connected to the output of the rectifying means of said control means, input means connected to the output of the rectifying means of the next-preceding control means and input means connected to the output of the rectifying means of the next-succeeding control means and output means, and AND circuit means having inputs connected to the output means of said additional adder means for transferring said television signal from said delay line to said output only when $$(V_{x+1}-V_x) \text{ AND } (V_{x+1}-V_{x+2}) \geqq 0$$

wherein $V_x$ is the rectified negative polarity voltage of the $X^{th}$ time delay stage of said delay line, $V_{x+1}$ is the rectified negative polarity voltage of the $(X+1)^{th}$ time delay stage, $V_{x+2}$ is the rectified negative polarity voltage of the $(X+2)^{th}$ time delay stage and AND indicates a logical AND operation.

8. A circuit arrangement as claimed in claim 2, wherein each of said control means further includes a symmetrical limiter circuit connected to the output of said control means for providing a control signal for controlling the transfer of said television signal from said delay line to said output means.

9. A circuit arrangement as claimed in claim 8, further comprising means for applying a common reference voltage to the symmetrical limiter circuit of each of said control means, said last-mentioned means comprising a common line connected to the symmetrical limiter circuit of each of said control means and coupled via a diode to the rectifying means of each of said control means, and means for applying to said common line a positive potential having a magnitude which is greater than the rectified voltage provided by the rectifying means of any of said common means.

References Cited

UNITED STATES PATENTS

| | | | |
|---|---|---|---|
| 3,141,926 | 7/1964 | Newell. | |
| 3,384,707 | 5/1968 | Bopp et al. -------- | 178—69.5 |
| 3,420,951 | 1/1969 | Gunther. | |

ROBERT L. GRIFFIN, Primary Examiner

A. H. EDDLEMAN, Assistant Examiner